Feb. 12, 1929.
J. W. LYONS
1,701,723
DIFFERENTIAL POWER TRANSMISSION DEVICE
Filed May 2, 1928    2 Sheets-Sheet 1
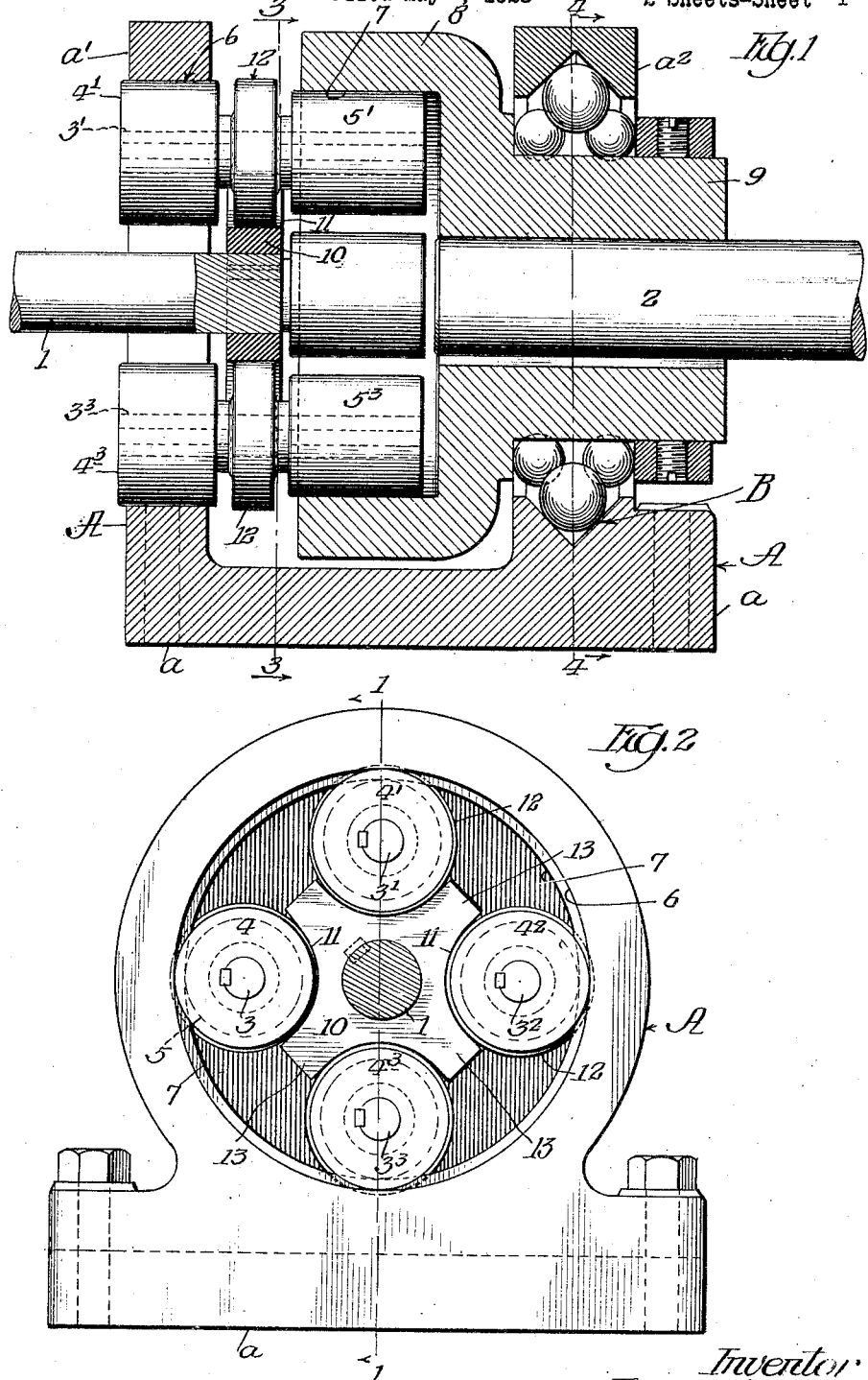
Inventor
James W. Lyons Feb. 12, 1929.　　　　　　　　　　　　　　　　　　　1,701,723
J. W. LYONS
DIFFERENTIAL POWER TRANSMISSION DEVICE
Filed May 2, 1928　　　　2 Sheets-Sheet 2
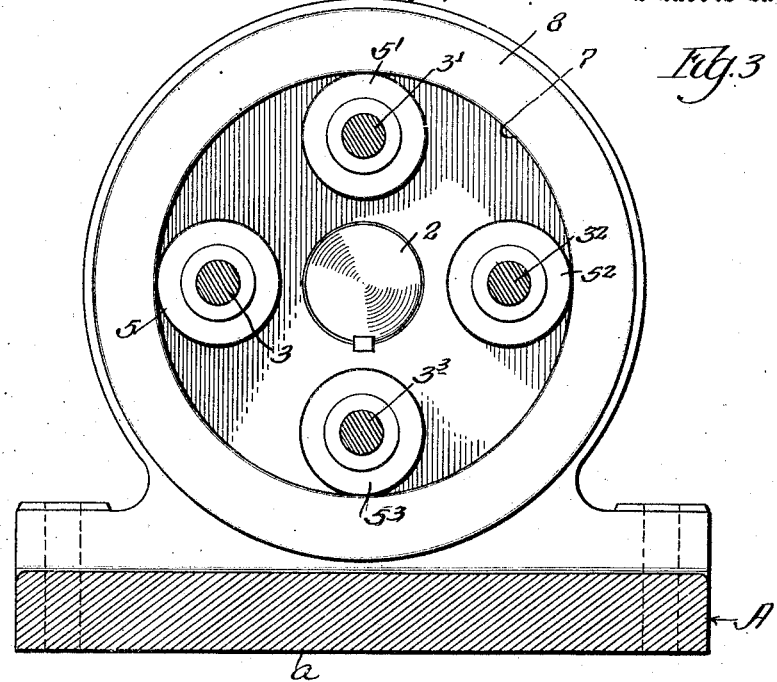
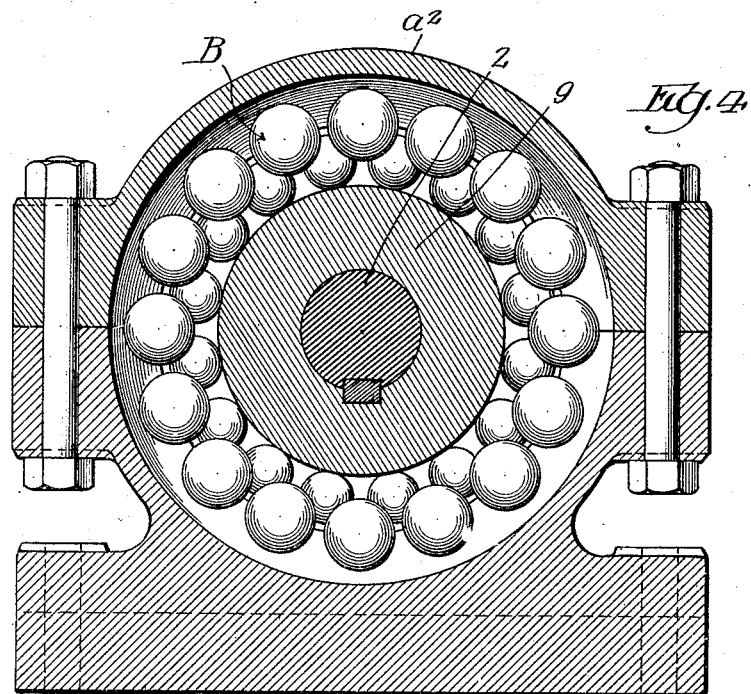
Inventor
James W. Lyons Patented Feb. 12, 1929.

1,701,723

UNITED STATES PATENT OFFICE.

JAMES W. LYONS, OF OAK PARK, ILLINOIS.

DIFFERENTIAL POWER-TRANSMISSION DEVICE.

Application filed May 2, 1928. Serial No. 274,504.

This invention relates to differential power transmission devices.

Objects of the invention are:

To provide a device for the purpose specified in which all moving parts will have rolling contacts only, thus practically eliminating friction loss so that it may operate with a minimum of lubrication; which, through the multiplication of transmission elements, provides for the transmission of power by means of a mechanism of relatively very small size, thus rendering it adaptable for a wide range of application and use; which is very strong and, due to the fact that sliding contacts are practically eliminated, very durable; to provide a device which is very simple as regards its physical structure and, consequently, inexpensive to manufacture; and which develops relatively great efficiency in operation, as compared with all devices for the transmission of power of which I have any knowledge.

To effect the objects of the invention, my improved power transmission device comprises the various features, combinations of features and details of construction hereinafter described and claimed.

In the accompanying drawings, in which my invention is fully illustrated:

Figure 1 is a sectional elevation of a power transmission device embodying my invention and improvements, the section being substantially on the line 1—1 of Fig. 2;

Figure 2 is an end elevation from the left side of Fig. 1;

Figure 3 is a sectional elevation on the line 3—3 of Fig. 1; and

Figure 4 is a sectional elevation on the line 4—4 of Fig. 1.

Describing the invention with reference to the drawings, A designates the frame of the device as a whole, comprising a base portion $a$ adapted to be bolted or otherwise secured to a suitable foundation or support, formed on which are spaced bearing supports $a$, $a^2$.

As shown, my improved power transmission device is designed and adapted for imparting rotation from a shaft 1, which may exemplify the shaft of an electric motor or other rotatable power driven member, to a shaft 2, which may exemplify any rotating part, at a differential rate of speed or R. P. M.

For purposes of convenient reference, the shafts or members 1 and 2 will be designated the first and second rotatable members, respectively.

What I now consider the preferable embodiment of my invention comprises a plurality of, as shown four, transmission shafts 3, $3'$, $3^2$ and $3^3$, mounted in symmetrical spaced relation to the rotatable members 1 and 2, so as to be freely movable about said rotatable members and also on their own axes, secured to opposite ends of which are what, for purposes of convenient reference, will be designated traction heads, comprising sets of heads 4, $4'$, $4^2$ and $4^3$, and 5, $5'$, $5^2$ and $5^3$, which, respectively, in operation, are adapted to run in contact with internal circular treads 6 and 7 formed in the bearing support $a'$ and in a flange 8 on a head 9 secured to the second rotatable member 2, rotatably mounted in the bearing support $a^2$, preferably by means of an anti-friction bearing designated as a whole B. Said bearing may exemplify any desired or approved form of anti-friction bearing, the particular bearing shown forming the subject-matter of an application for U. S. Letters Patent, heretofore filed by me in the Patent Office on or about the 23rd day of April, 1928, and numbered serially 272,138, to which reference is here made for a description thereof in detail.

As shown, the traction heads 4 to $4^3$ and 5 to $5^3$ have plain cylindrical surfaces, but my invention contemplates the use of other forms of traction heads, if desired.

The transmission shafts 3 to $3^3$ have operative connection with the first rotatable member 1, constructed and arranged to impart planetary movement thereto about the rotatable members 1 and 2 in the same direction as the first rotatable member 1, while, at the same time, permitting said shafts to move outwardly away from said rotatable members under centrifugal force due to rotation at high speed of said first rotatable member, thereby effecting pressure contact of said traction heads 4 to $4^3$ and 5 to $5^3$, respectively, with the threads 6 and 7 on the bearing support $a'$ and flange 8 of the head 9, respectively, corresponding to the rate of rotation of the first rotatable member, contact of the traction heads 4 to $4'$ with the fixed tread 6 on the bearing support $a'$ operating, in an obvious manner to impart independent axial rotation to said traction heads and thus to the transmission shafts 3 to 3³ and with them to the traction heads 5 to 5³, all in a direction opposite to that of the first rotatable member. Obviously, also, contact of the traction heads 5 to 5³, if of smaller diameter than the diameter of the heads 4 to 4³, with the tread 7 while rotating will operate to impart rotation to the head 9 and thus to the second rotatable member 2 in the same direction as the first rotatable member.

With the described construction, if the traction heads 4 to 4³ and 5 to 5³ are of the same size, no motion will be imparted to the second rotatable member by rotation of the first member, whereas, if said sets of traction heads are of different sizes, rotation of the first rotatable member will impart movement to the second rotatable member at a rate of speed or R. P. M., different from that of the first member, either in the same or opposite direction from said first member, as the traction heads 5 to 5³ are smaller or larger than the heads 4 to 4³, relatively small traction heads 5 to 5³ imparting rotation to said second rotatable member in the same direction as the first rotatable member, and relatively large traction heads 5 to 5³, imparting rotation to said second rotatable member in a direction opposite to the first rotatable member.

The diameter of the fixed tread 6 and the relative diameters of the traction heads 4 to 4³ and 5 to 5³ are the controlling factors in the direction and rate of rotation or R. P. M. of the second rotatable member relative to the first rotatable member.

Specifically and preferably, the manner of mounting the transmission shafts 3 to 3³ is as follows: Secured to the first rotatable member 1 is what may be designated a spider 10 provided with peripheral cradles or recessed seats 11, and adjusted over the transmission shafts 3 to 3³ between the traction heads 4 to 4³ and 5 to 5³, respectively, secured to opposite ends thereof, are anti-friction bearing members, indicated at 12, and which may exemplify any form of anti-friction bearing suitable for the purpose, a desirable and preferable form of anti-friction bearing being that which forms the subject-matter of my said application for U. S. Letters Patent Serial Number 272,138.

The shells or casings of said anti-friction bearings are fitted to the cradles or recessed seats 11 on the spider 10 with slight clearance, and said bearing member and with them the transmission shafts 3 to 3³ are propelled around the rotatable members 1 and 2 by rigid parts 13 of the spider 10 which form the cradles or seats 11, and which extend between adjacent bearing numbers 12, the relation being such that the initial action of the spider as rotation of the first rotatable member begins, will be in the nature of a wedging action which will force the bearing members 12 and transmission shafts 3 to 3³ outwardly to effect pressure contact of the traction heads 4 to 4³ and 5 to 5³ with their respective treads 6 and 7, the pressure of said traction heads against their treads being increased by centrifugal force as the speed of said first rotatable member increases.

A great advantage inherent in my improved transmission device, is that, due to the use of a plurality of transmission shafts, the total power transmitted by the device will be distributed equally among the different shafts, thus providing—by increasing the number of transmission shafts—for transmitting great power by means of a relatively very small device, the individual parts of which will transmit only a small fraction of the total load, thereby rendering it possible to make individual parts of the device relatively very light and correspondingly reducing the cost of production.

A feature inherent in my improved power transmission device to which I deem it desirable to call particular attention is that the traction heads 4 to 4³ and 5 to 5³ acting on respective concentric treads 6 and 7 under the great centrifugal force which they, together with the transmission shafts 3 to 3³ and the anti-friction bearing members 12 will develop in operation, will effect and maintain parallelism of said transmission shafts with the rotatable members 1 and 2, thus rendering negligible any tendency of the traction heads 5 to 5³ to drag under the resistance of the load to which the second rotatable member will be subjected in use.

Particular advantages of my improved power transmission device, are:

1. The great power which may be transmitted by a relatively very small device,
2. The relatively light duty to which the separate parts of the device will be subjected in operation,
3. The consequent very small size and compactness of the device,
4. Its simplicity,
5. Its low cost of manufacture and maintenance,
6. The elimination of friction in the device by providing rolling contacts only, and
7. The elimination of all means other than centrifugal force for producing operating pressure contacts in power transmission devices of the type commonly known as friction transmissions.

I claim:

1. In a differential power transmission device, the combination of rotatable members mounted in axial alignment with each other, comprising a first member adapted to be power driven, and a second member, transmission shafts mounted in spaced relation to said rotatable members so as to be bodily rotatable about the same in a circular orbit and also rotatable on their own axes, means rendered operative by rotation of said first rotatable member for imparting planetary rotation to said transmission shafts about said rotatable members constructed and arranged to permit movement thereof outwardly relative to said rotatable members under centrifugal force, traction heads secured to said transmission shafts and arranged in sets, parts provided with interior treads opposed to different sets of traction heads on said transmission shafts, comprising a fixed part and a part rotatable with said second rotatable member, the traction heads of the same set being of the same diameter and of different sets being of different diameters and the diameter of the tread for the larger set of traction heads being equal to that of the tread for the smaller set plus the difference in the diameters of the traction heads of different sets, centrifugal force operating to effect and maintain engagement of the traction heads of different sets with the treads opposed thereto, respectively, and also forming the sole means for effecting and maintaining parallelism of the transmission shafts with said rotatable member and with each other in operation.

2. A differential power transmission device as specified in claim 1, in which the means for mounting said transmission shafts and for imparting planetary rotation thereto, comprises bearing members to which, respectively, a transmission shaft is fitted so as to turn freely, and a spider secured to said first rotatable member provided with seats in which the bearing members for said transmission shafts are loosely confined.

3. A differential power transmission device as specified in claim 1, in which the traction heads of different sets are spaced apart, and the means for mounting said transmission shafts and for imparting planetary rotation thereto, comprises bearing members to which, respectively, a transmission shaft is fitted so as to turn freely, said bearing members comprising a bearing member on each transmission shaft positioned between the traction heads thereon, and a spider secured to said first rotatable member provided with seats in which the bearing members for said transmission shafts are loosely confined.

4. A differential power transmission device as specified in claim 1, in which the traction heads of different sets are spaced apart, and the means for mounting said transmission shafts and for imparting planetary rotation thereto, comprises bearing members to which, respectively, a transmission shaft is fitted so as to turn freely, said bearing members comprising a single bearing member on each transmission shaft positioned between the traction heads thereon, and a spider secured to said first rotatable member provided with seats in which the bearing members for said transmission shafts are loosely confined.

5. A differential power transmission device as specified in claim 1, in which the means for mounting said transmission shafts and for imparting planetary rotation thereto, comprises anti-friction bearing members to each of which, respectively, a transmission shaft is fitted so as to turn freely, said bearing members, respectively, comprising a casing which encloses the anti-friction members thereof, and a spider secured to said first rotatable member provided with seats in which the casings of said bearing members are loosely confined.

6. A differential power transmission device as specified in claim 1, in which the means for mounting said transmission shafts and for imparting planetary rotation thereto about said rotatable members comprises a bearing member on each of said shafts and a spider secured to the first rotatable member provided with seats in which, respectively, bearing members on different transmission shafts are confined, the initial action of said spider on said bearing members being a wedging action, whereby, as rotation of the first rotatable member begins, said bearing members and with them the transmission shafts will be forced outwardly to effect engagement of the sets of traction heads on said transmission shafts with the treads opposed thereto, respectively.

In witness that I claim the foregoing as my invention, I affix my signature this 28th day of April, A. D. 1928.

JAMES W. LYONS.